US010394633B2

(12) United States Patent
Patil et al.

(10) Patent No.: US 10,394,633 B2
(45) Date of Patent: Aug. 27, 2019

(54) ON-DEMAND OR DYNAMIC DIAGNOSTIC AND RECOVERY OPERATIONS IN CONJUNCTION WITH A SUPPORT SERVICE

(71) Applicant: MICROSOFT TECHNOLOGY LICENSING, LLC, Redmond, WA (US)

(72) Inventors: Nagaraj Patil, Redmond, WA (US); Kiran Nallabothula, Redmond, WA (US); Doru Nica, Redmon, WA (US); Himanshu Misra, Bellevue, WA (US); Minjun Wu, Sammamish, WA (US); Raghavendra Bhuthpur, Redmond, WA (US); Sathish Kumar Venkat Rangam, Kirkland, WA (US); Srihari Busam, Redmond, WA (US); Nagaraju Palla, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/283,234

(22) Filed: Sep. 30, 2016

(65) Prior Publication Data
US 2018/0095847 A1    Apr. 5, 2018

(51) Int. Cl.
*G06F 11/00* (2006.01)
*G06F 11/07* (2006.01)
(Continued)

(52) U.S. Cl.
CPC ...... *G06F 11/0748* (2013.01); *G06F 11/0784* (2013.01); *G06F 11/0793* (2013.01);
(Continued)

(58) Field of Classification Search
CPC combination set(s) only.
See application file for complete search history.

(56) References Cited

U.S. PATENT DOCUMENTS 5,983,364 A * 11/1999 Bortcosh ............. G06F 11/2257
714/25
6,807,643 B2 * 10/2004 Eckardt ............... G06F 11/2284
713/2
(Continued)

FOREIGN PATENT DOCUMENTS

EP    1643426 A2    4/2006
EP    1847949 A1   10/2007
(Continued)

OTHER PUBLICATIONS

"Fix Outlook account problems in Office 365", Retrieved on: Jun. 29, 2016 Available at: https://portal.office.com/support/help.aspx?sid=sara#/330cfd4a-358a-47fc-a679-71c762039f09.
(Continued)

*Primary Examiner* — Amine Riad
(74) *Attorney, Agent, or Firm* — Michael Best & Friedrich LLP

(57) ABSTRACT

An assistance service through its local client application or agent at a user's device hardware and software environment information and monitor a health of one or more applications. Upon detecting an issue or being activated by the user, the assistance service may perform diagnostic and/or recovery actions. If predefined or dynamically determined recovery actions are inadequate to address the issue, the assistance service may engage a support service providing collected user device environment information and received server environment information to the support service. A history of attempted recovery actions and diagnostic results may also be provided. The assistance service may, through a user interface of its local, client or agent, facilitate communication with the supports service and perform recovery actions, suggested by the support service providing feedback to the support service. When needed, the assistance service may
(Continued)

rollback a version of locally installed or server-side applications to address the issue.

20 Claims, 7 Drawing Sheets

(51) Int. Cl.
*G06Q 10/10* (2012.01)
*G06Q 50/00* (2012.01)

(52) U.S. Cl.
CPC ........... *G06Q 10/107* (2013.01); *G06Q 50/01* (2013.01); *G06F 11/0769* (2013.01)

(56) References Cited

U.S. PATENT DOCUMENTS

| | | | |
|---|---|---|---|
| 7,593,991 B2 | 9/2009 | Friedman et al. | |
| 7,647,559 B2 | 1/2010 | Yozell-Epstein et al. | |
| 8,140,905 B2 | 3/2012 | Beaty et al. | |
| 8,239,853 B2 | 8/2012 | Lee | |
| 8,615,380 B2* | 12/2013 | Kim | D06F 39/005 |
| | | | 702/185 |
| 8,631,079 B2 | 1/2014 | Affronti et al. | |
| 8,701,046 B2 | 4/2014 | McCann et al. | |
| 8,725,818 B1 | 5/2014 | Covitz et al. | |
| 9,021,428 B2 | 4/2015 | Ajith Kumar et al. | |
| 9,483,886 B2* | 11/2016 | Bergerhoff | G07C 9/00007 |
| 2004/0068545 A1 | 4/2004 | Daniell et al. | |
| 2004/0225381 A1 | 11/2004 | Ritz et al. | |
| 2005/0015678 A1 | 1/2005 | Miller | |
| 2006/0168543 A1 | 7/2006 | Zaner-godsey et al. | |
| 2006/0242286 A1 | 10/2006 | Hawkins et al. | |
| 2009/0013216 A1 | 1/2009 | Abrashkevich et al. | |
| 2009/0055684 A1 | 2/2009 | Jamjoom et al. | |
| 2010/0095224 A1 | 4/2010 | Yozell-epstein et al. | |
| 2010/0229022 A1 | 9/2010 | Anand et al. | |
| 2012/0124147 A1 | 5/2012 | Hamlin et al. | |
| 2012/0233227 A1 | 9/2012 | Alexander et al. | |
| 2012/0284639 A1 | 11/2012 | Yuniardi et al. | |
| 2012/0324503 A1* | 12/2012 | Kim | H04N 21/4425 |
| | | | 725/25 |
| 2013/0290442 A1 | 10/2013 | Dgani | |
| 2014/0214988 A1 | 7/2014 | Nicolaou et al. | |
| 2014/0310222 A1 | 10/2014 | Davlos et al. | |
| 2015/0100895 A1 | 4/2015 | Parmar et al. | |
| 2015/0161123 A1 | 6/2015 | Sterling et al. | |
| 2015/0161344 A1* | 6/2015 | Chung | G06F 19/3418 |
| | | | 705/2 |
| 2015/0195182 A1 | 7/2015 | Mathur et al. | |
| 2016/0065511 A1 | 3/2016 | Ganin et al. | |
| 2017/0286199 A1 | 10/2017 | Soini et al. | |
| 2018/0095814 A1 | 4/2018 | Patil et al. | |

FOREIGN PATENT DOCUMENTS

| | | |
|---|---|---|
| WO | 2011055013 A1 | 5/2011 |
| WO | 2015148328 A1 | 10/2015 |

OTHER PUBLICATIONS

"IBM Knowledge Center", Retrieved on: Jun. 29, 2016 Available at: https://www.ibm.com/support/knowledgecenter/POWER5/ipha5_p5/ipha5kickoff.htm.

"Vmware: Knowledge Base", Retrieved on: Jun. 29, 2016 Available at: https://kb.vmware.com/selfservice/microsites/search.do?language=en_US&cmd=displayKC&externalId=2129384.

"Create a Custom Arrangement to Sort by Conversation in Microsoft Entourage", Retrieved From: https://web.archive.org/web/20070813192347/https://www.rit.edu/its/services/desktop_support/mac/entouragecustomviewbyconv.html, Jul. 24, 2007, 2 Pages.

"How Can We Improve Airmail", Retrieved From: https://airmailapp.uservoice.com/forums/209001-airmail-mac-1-x/suggestions/3722190-make-attachments-accessible-from-conversation-mess, Retrieved on: Jan. 28, 2015, 2 Pages.

"New book: Microsoft Outlook 2010 Step by Step", Retrieved From: https://blogs.msdn.microsoft.com/microsoft_press/2010/07/16/new-book-microsoft-outlook-2010-step-by-step/, Jul. 16, 2010, 7 Pages.

"Final Office Action Issued in U.S. Appl. No. 14/672,032", dated Jan. 24, 2018, 26 Pages.

"Non Final Office Action Issued in U.S. Appl. No. 14/672,032", dated Jun. 4, 2018, 29 Pages.

"Non Final Office Action Issued in U.S. Appl. No. 14/672,032", dated Sep. 25, 2017, 25 Pages.

"Non Final Office Action Issued in U.S. Appl. No. 15/283,276", dated May 31, 2018, 16 Pages.

"International Search Report and Written Opinion Issued in PCT Application No. PCT/US2016/023498", dated Jun. 10, 2016, 11 Pages.

* cited by examiner

ON-DEMAND OR DYNAMIC DIAGNOSTIC AND RECOVERY OPERATIONS IN CONJUNCTION WITH A SUPPORT SERVICE

BACKGROUND

Hosted services are increasingly providing valuable services to people in their home and work lives. Bringing applications such as word processing, spreadsheet, presentation, communication, notetaking, collaboration, and others under an umbrella, such services allow users to access, edit, and collaborate on documents through locally installed or cloud-accessible applications.

Hosted services and associated applications form a complex environment that involves local and cloud-stored data, device resources, user attributes, operating system and application configurations, among other things. Such services and their components are also subject to frequent updates and upgrades. Thus, they present a challenge to users when errors happen. Regular users may not be expected to diagnose and correct a majority of errors or crashes. A manual diagnostic and recovery process that involves expert help may also not be feasible or at least experience degrading when a service has a large number (e.g., hundreds of thousands) users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to on-demand or dynamic diagnostic and recovery operations in conjunction with a support service. In some examples, hardware and software environment information associated with a user device may be collected and hardware and software environment, information associated with one or more servers executing a hosted service may be received. The support service may be engaged by an assistance application or component of an assistance service at the user device in response to exhausting a set of automatic diagnostic and recovery actions associated with a component of the hosted service. The collected hardware and software environment information associated with the user device and the received hardware and software environment information associated with the one or more servers may be provided to the support service. A communication may be facilitated between a user associated with the user device and an operator of the support service, and one or more diagnostic and recovery actions instructed by the operator of the support service may be performed.

These and other features and advantages will be apparent from a reading of the following detailed description and a review of the associated drawings. It is to be understood that both, the foregoing general description and the following detailed description are explanatory and do not restrict aspects as claimed.

DETAILED DESCRIPTION

Figure 1:
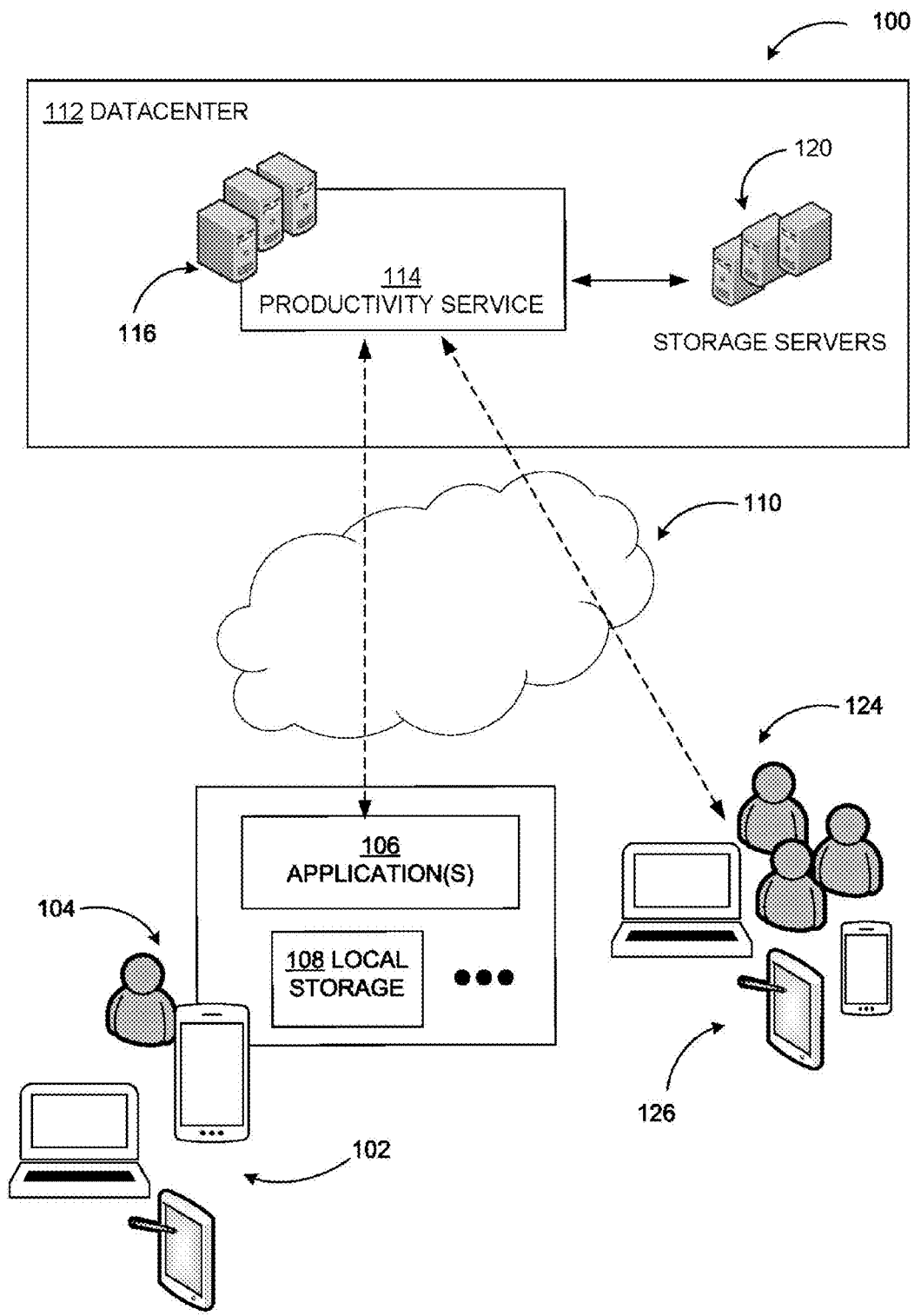
FIG. 1 includes an example system environment where on-demand or dynamic diagnostic and recovery operations in conjunction with a support service may be implemented.

As briefly described above, embodiments are directed to on-demand or dynamic diagnostic and recovery operations in conjunction with a support service. In some examples, an assistance service through its local client application or agent at a user's device (or devices) may collect telemetry information associated with the user's operating environment (physical and software operation parameters and configurations) and monitor a health of one or more applications. Upon detecting an issue or being activated by the user, the assistance service may perform diagnostic and/or recovery actions. If predefined or dynamically determined recovery actions are inadequate to address the issue, the assistance service may engage a support service providing collected (local) and received (server-side) information to the support service. A history of attempted recovery actions and diagnostic results may also be provided. The assistance service may, through a user interface of its local client or agent, facilitate at least a portion of communication with the supports service such as messaging or online conference. The assistance service may also be used to perform recovery actions suggested by the support service and provide feedback to the support service. When needed in some cases, the assistance service may rollback a version of locally installed or server-side applications to address the issue.

In the following detailed description, references are made to the accompanying drawings that form a part hereof, and in which are shown by way of illustrations, specific embodiments, or examples. These aspects, may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize, that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, anon-volatile memory, a hard drive, a flash drive, a floppy disk, or a compact disk, and comparable hardware media.

Throughout this specification, the term "platform" may be a combination of software and hardware components for providing on-demand or dynamic diagnostic and recovery operations in conjunction with a support service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example system environment where on-demand or dynamic, diagnostic and recovery operations in conjunction with a support service may be implemented.

As illustrated in diagram 100, an example system may include a datacenter 112 hosting a productivity service 114 configured to provide a variety of productivity related applications and may be accessed across multiple devices and users. The datacenter 112 may include one or more processing servers 116 configured to execute the productivity service 114, among other components. In some embodiments, at least one of the processing servers 116 may be operable to manage the productivity service 114, where data from devices (such as devices 122, 126) may be stored with the cloud stored data at storage servers 120 (or associated data stores). As described herein, the productivity service 114 may be implemented as software, hardware, or combinations thereof.

In some embodiments, the productivity service 114 may be configured to interoperate with various applications to provide services such as word processing, spreadsheet processing, presentation, note taking, communications, scheduling, and comparable ones. For example, as illustrated in the diagram 100, a user 104 may execute a thin (e.g., a web browser) or a thick (e.g., a locally installed client application) Version of an application 106 through the device 102 with which the productivity service 114 may be configured to integrate and interoperate with over one or more networks, such as network 110. The application 106 may be an application hosted by the productivity service, such as a word processing application, for example. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In an example embodiment, the productivity service 114 may be configured to receive content from the application 106 of the device 102. The received content may be stored remotely at the productivity service 114 within the storage servers 120, for example. As the productivity service 114 includes a number of applications and involves a large number of local and remote resources, errors leading, to application crashes or other undesirable results may occur. When a serious error like this occurs, users may have technical support help available. However, given the large number of users subscribing to modern hosted services, scheduling and coordinating technical support may degrade user experience and be expensive to provide for service providers. According to some embodiments, on-demand or dynamic diagnostic and recovery operations in conjunction with a support service may be provided by an assistance service or application that may be part of the productivity service 114 or a third party service.

Productivity service 114 is used as an illustrative example to describe various aspects of embodiments herein. However, embodiments are not limited to a productivity service. An assistance application or service providing on-demand or dynamic diagnostic and recovery operations in conjunction with a support service may be implemented with any hosted service such as a collaboration service, an online storage service, and others using the principles described herein.

A system according to embodiments allows on-demand or dynamic diagnostic and recovery operations in conjunction with a support service. By automatically and dynamically diagnosing system and application issues, performing recovery actions in conjunction with a support service, collecting statistical data, and performing notification tasks, increased efficiency, reduced local and cloud computing resource usage, reduced bandwidth usage, and increased security may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users taking advantage of hosted services.

Figure 2:
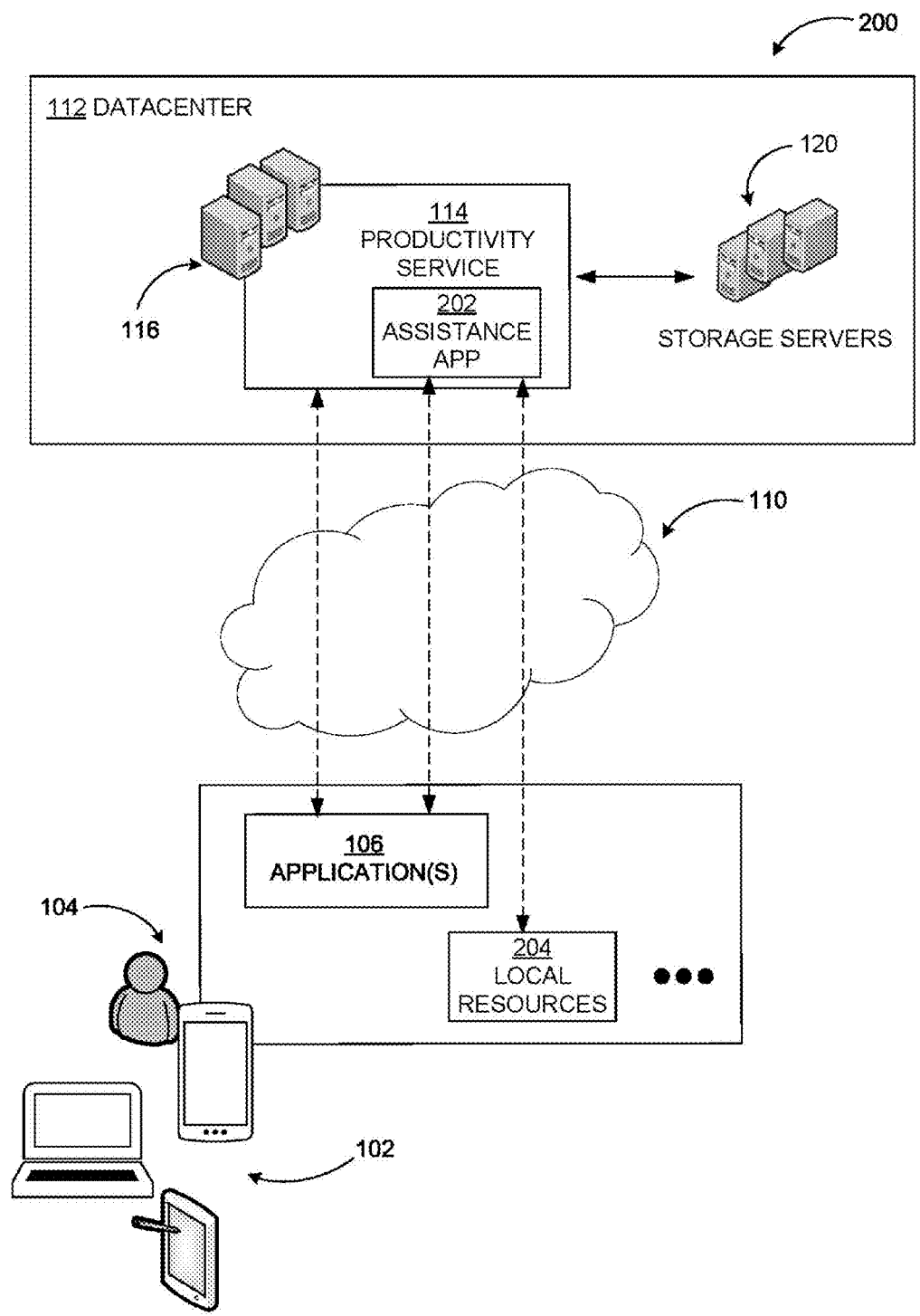
FIG. 2 illustrates conceptually on-demand or dynamic diagnostic and recovery operations in conjunction with a support service.

FIG. 2 illustrates conceptually on-demand or dynamic diagnostic and recovery operations in conjunction with a support service.

As shown in diagram 200, diagnostic, recovery, and related actions for the productivity service 114 and its components may be performed by an assistance application 202 that is part of the productivity service 114. The assistance application 202 may be executed on one of the servers 116. In other embodiments, the assistance application 202 or one or more components may be executed on the local devices such as device 102. In further embodiments, the assistance application may be part of an independent assistance service executed on a separate server and provide personalized diagnostics, troubleshooting, recovery, and notification to multiple hosted services.

The assistance application may receive information from a number of sources (e.g., local resources 204). For example, system and device configuration information such as installed and/or running applications, memory availability, processor availability, network bandwidth, display characteristics, and other hardware and software state information may be received from operating systems, local and network task/system managers, other applications and/or services used by the user 104. Because user credentials determine what resources a user has access to and under which circumstances, user credentials may be retrieved from a credential manager or, account manager agent. Telemetry data associated with past and current usage may be received from telemetry engines or similar data collectors. Because interactivity with other applications (within or outside the productivity service 114) may have an impact on the performance of individual, applications, data from other applications may also be retrieved through standardized or custom, application programming interfaces (APIs) on those applications.

In some embodiments, the assistance application 202 may continuously receive data and monitor conditions to identify error patterns. In other embodiments, the assistance application 202 may be activated by the user 104 upon encountering a problem and collect the data at activation to perform diagnostics. The assistance application 202 may analyze collected data and the encountered error, compare to known errors in a database, and determine possible solutions. The assistance application 202 may then apply the potential solutions (recovery actions) automatically. In some cases, the assistance application 202 may prompt the user 104 to take action such as sign off and sign in, or close certain applications, etc.

If a solution is found to address the encountered problem, the assistance application 202 may forward information associated with the encountered error, the identified solution, and state, of hardware/software at the time of the error to a data insights database for analysis and updating, of errors/solutions database. If a working solution is not identified, the assistance application 202 may escalate the issue to a support department of the productivity service 114 allowing support personnel to have all the background information and contact the user 104 without the user having to go through the process of calling the support department, describing the issue, etc.

In other embodiments, the assistance application 202 may engage a support service providing collected (local) and received (server-side) information to the support service if predefined or dynamically determined recovery actions are inadequate to address the issue. A history of attempted recovery actions and diagnostic results may also be provided. The assistance application may, through a user interface of its local client or agent, facilitate at least a portion of communication with the supports service such as messaging or online conference. The assistance application may also be used to perform recovery actions suggested by the support service and provide feedback to the support service.

Figure 3:
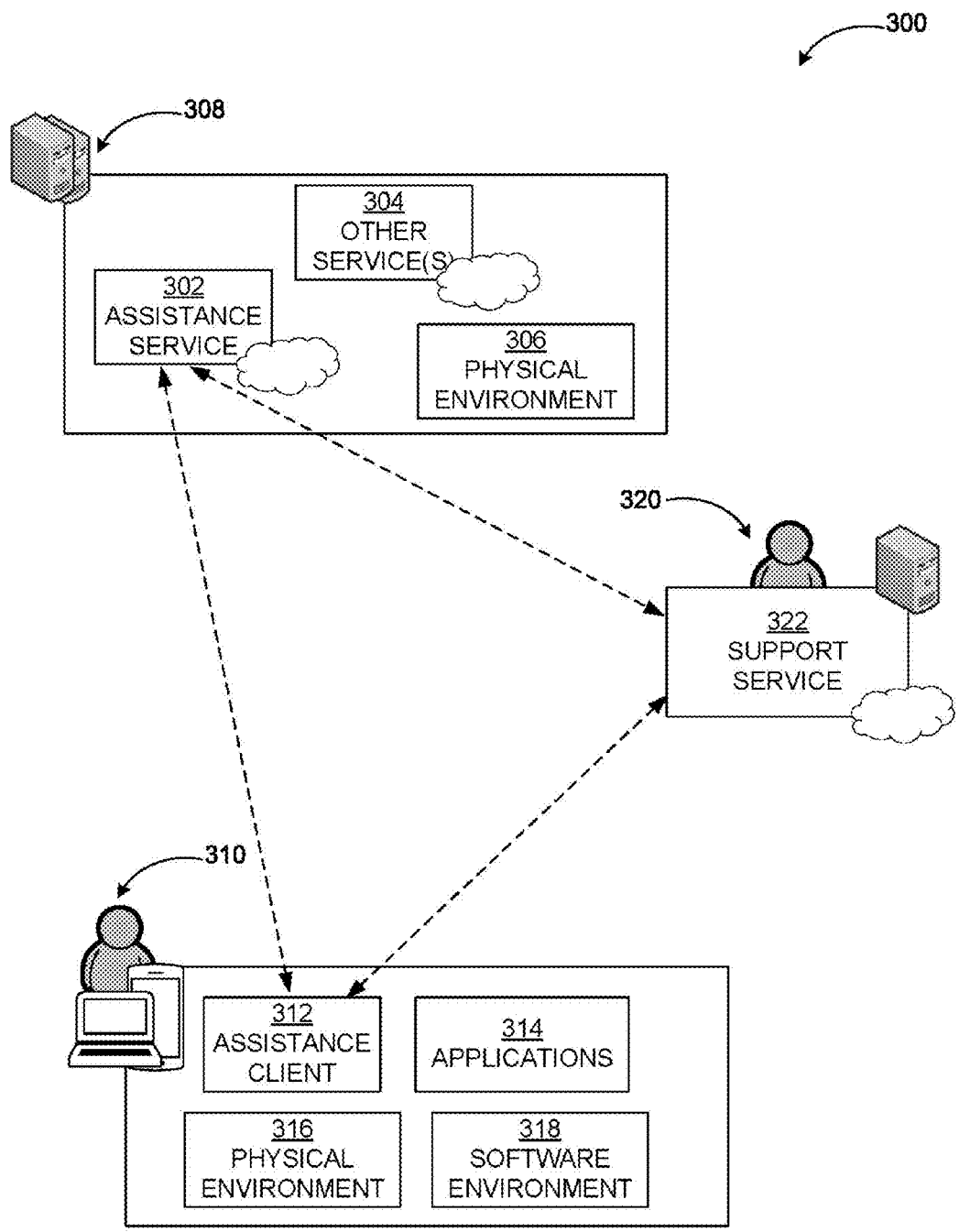
FIG. 3 illustrates example interactions between major components of a system for on-demand or dynamic diagnostic and recovery operations in conjunction with a support service.

FIG. 3 illustrates example interactions between major components of a system for on-demand or dynamic diagnostic and recovery operations in conjunction with a support service.

In diagram 300, example major components in providing on-demand or dynamic diagnostic and recovery operations in conjunction with a support service are shown. An assistance application or service according to embodiments may be implemented with additional or fewer components performing additional or fewer tasks than those described herein.

In, the example configuration of diagram 300, an assistance service 302 may be executed on one or more servers such as server 308. A hosted service such as a productivity service may also be executed on the same or different servers. The assistance service may manage diagnostic, recovery, and related actions for subscribers of the productivity service or other services 304. In a hosted service environment, users may access the functionality provided by the hosted service (other services 304) through locally installed (thick) client applications or through web browsers (thin). Thus, issues arising with the functionality or applications of the hosted service may be cause by one or more hardware or software components at the user's client device or at the servers executing the hosted service. Therefore, a software environment and a physical environment 306 of the example server 308 may provide insight into resolving the issue(s).

The assistance service 302 may provide diagnostic and recovery aid, to a user 310 on one or more of their devices through a locally installed assistance client 312 or web accessed assistance client. As discussed above, software environment 318 and physical environment 316 may have an impact on the issue(s). Therefore, the assistance client 312 may collect information associated with both. The software environment 318 may include things such as a number and a type of applications 314 installed/executed on the user's client device, configurations of such applications, operating system type and version, states of various applications 314 being executed, and similar information. The physical environment 316 may include things such as available and used storage, memory, processor capacity, network connectivity, and comparable items.

Upon exhausting diagnostic and recovery actions it is capable of, the assistance service 302 may determine that the issue needs to be elevated to a support service 322. The support service 322 may include automated and/or human operators. To prevent the user from having to repeat the description of the issue and the details of attempted recovery actions to the support service, the assistance service 302 may provide the collected and received client-side and server-side environment information, diagnostic results, attempted recovery actions and their results to the support service 322. Thus, when a human operator 320 at the support service 322 takes over the case, they may have the needed background information in front of them.

In some cases, the support service 322 may employ more sophisticated tools, which may diagnose the issue based on the information provided by the assistance service 302. In other cases, the human operator 320 may need to communicate with the user 310. To enhance the user experience in resolving the issue(s), the assistance service 302 may also provide user availability/preference for communication information to the support service 322 (receiving that information directly from the user). In some embodiments, the assistance service 302 may include communication capabilities and facilitate the communication over one or more modes between the user 310 and the human operator 320 or the supports service 322. For example, the assistance service 302 may facilitate a message exchange session, an audio online conference, a video online conference, and similar ones.

Furthermore, the assistance service 302 may be configured to perform some or all of the recovery actions suggested by the support service 322. For example, instead of the user 310 being told, by the human operator 320 to deactivate an application or restart their computing device and doing so, the assistance service 302 may perform those tasks and notify the user 310 about what is being done. As a typical user is not expected to have expert knowledge on the hardware and software aspects of their computing device(s), having an expert assistance service perform the diagnostics, attempt recovery actions, and manage interaction with a support service may optimize the diagnostic and recovery process, enhance user interaction, and reduce consumption of resource such as processing capacity, network capacity, etc. by reducing unnecessary actions and repetitions.

Figure 4:
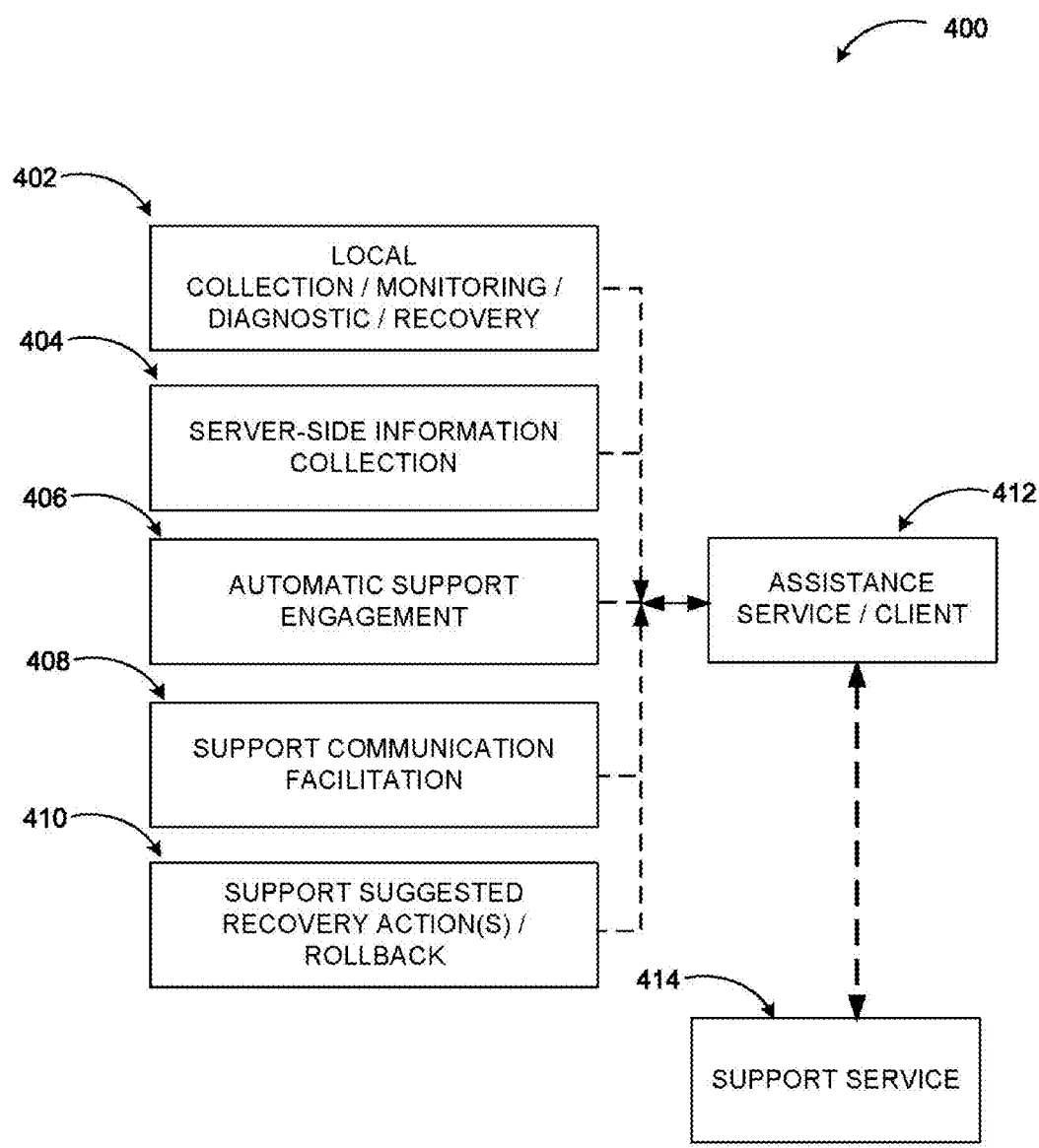
FIG. 4 illustrates example actions performed by components in providing on-demand or dynamic diagnostic and recovery operations in conjunction with a support service.

FIG. 4 illustrates example actions performed by components in providing on-demand or dynamic diagnostic and recovery operations in conjunction with a support service.

Diagram 400 shows some example actions that may be performed by an assistance service and/or its client 412 on a user's computing device. As, part of its automated diagnostic and recovery tasks, the assistance service may collect and/or monitor software and, hardware environment information on the user's computing device (402) as discussed above. In addition, the assistance service may receive server-side software and hardware environment information 404 from the server(s) executing the hosted service whose issue is being diagnosed. The wide range of information collected and received in the above phases may be analyzed, tabulated, and correlated. The assistance service may also make inferences based on the collected information.

If the automated diagnostic and recovery options are exhausted, the assistance service may be configured to automatically engage 406 a support service 414. To aid the support service to diagnose and resolve the issue(s) rapidly and accurately, the assistance service may provide the collected and received environment information, its analysis results, and/or its inferences to the support service upon engagement.

As part of its operations, the assistance service may query the user about his or her contact preferences (communication mode, timing, etc.). Upon engaging the support service 414, the assistance service may provide those user preferences such that the user can be contacted conveniently. In some examples, the assistance service may include communication facilitation capability and facilitate communication 408 between the user and an operators of the support service through one or more modes.

In addition, to the above operations, the assistance service may also aid the support service in performing at least some of the recovery actions. For example, the support service operator may decide to try some configuration changes, deactivation or activation of some applications, or a restart of the computing device. Instead of instructing and having the user perform those actions and similar ones, the assistance service may perform the suggested recovery actions 410 while notifying the user about which action is being performed. In some cases, a version or configuration incompatibility may be the cause of the issue. In such scenarios, the assistance service may facilitate a rollback of the current version or configuration of an application, hosted service, or other software settings to a previous one to resolve the issue.

The examples provided in FIGS. 1 through 4 are illustrated with specific systems, services, applications, modules, codes, and notifications. Embodiments are not limited to environments according to these examples. On-demand or dynamic diagnostic and recovery operations in conjunction with a support service may be implemented in environments employing fewer or additional systems, services, applications, engines, codes, and user experience configurations. Furthermore, the example systems, services, applications, modules, and notifications shown in FIG. 1 through 4 may be implemented in a similar manner with other values using the principles described herein.

Figure 5:
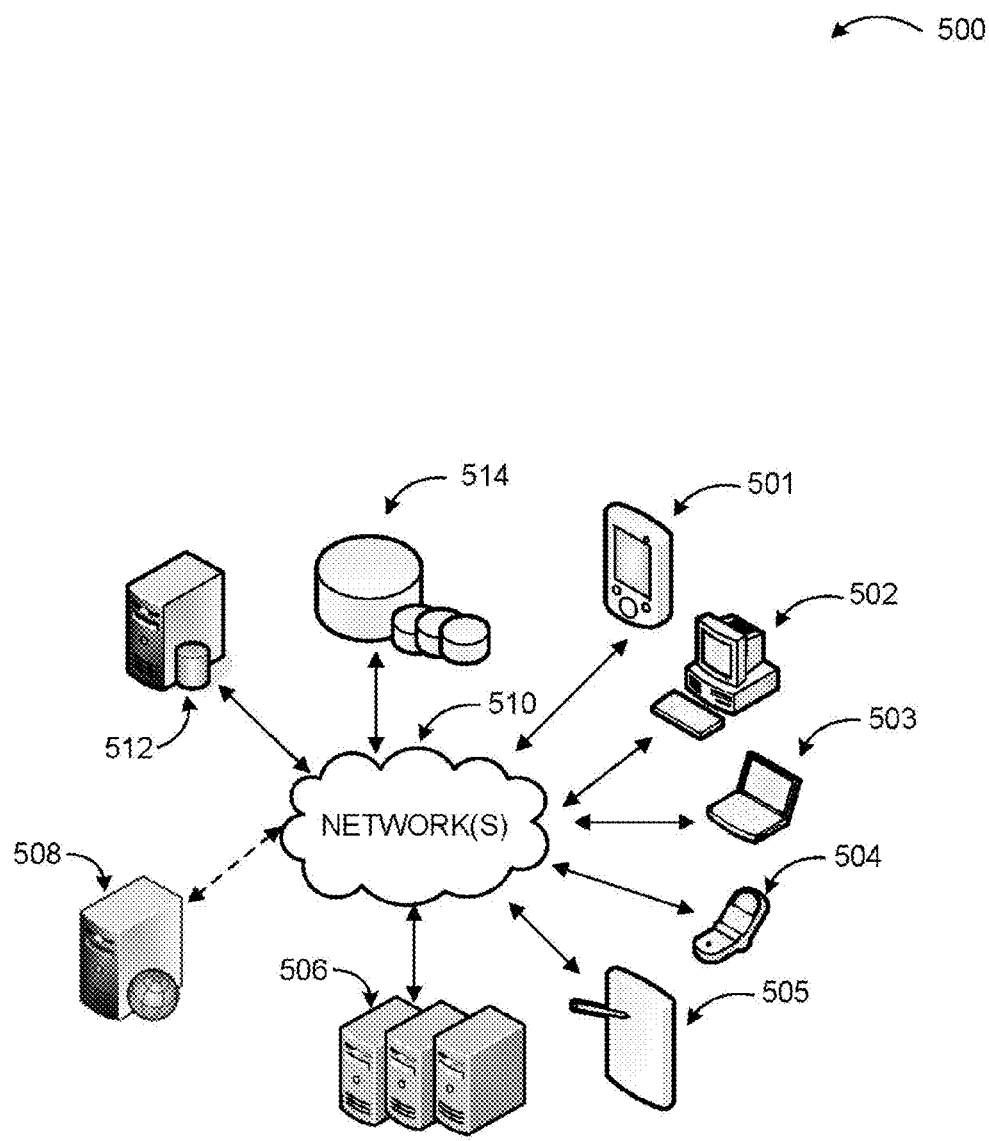
FIG. 5 is a networked environment, where a system according to embodiments may be implemented.

FIG. 5 is a networked environment, where a system according to embodiments may be implemented. In addition to locally installed applications (for example, application 106), on-demand or dynamic diagnostic and recovery operations in conjunction with a support service may also be employed in conjunction with hosted applications and services (for example, a productivity service 114) that may be implemented via software executed over one or more servers 506, individual server 508, or at client devices, as illustrated in diagram 500. A hosted service or application may communicate with client applications on, individual computing devices such as a handheld computer 501, a desktop computer 502, a laptop computer 503, a smart phone 504, a tablet computer (or slate), 505 ('client devices') through network(s) 510 and control a user interface presented to users.

Client devices 501-505 are used to access the functionality provided by the hosted service or application. One or more of the servers 506 or server 508 may be used to provide a variety of services as discussed above. Relevant data such as cloud stored versions of the files may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, engines, data sources, and data distribution systems may be employed for on-demand or dynamic diagnostic and recovery operations in conjunction with a support service. Furthermore, the networked environments discussed in FIG. 5 are for illustration purposes only. Embodiments are not limited to the example applications, engines, or processes.

Figure 6:
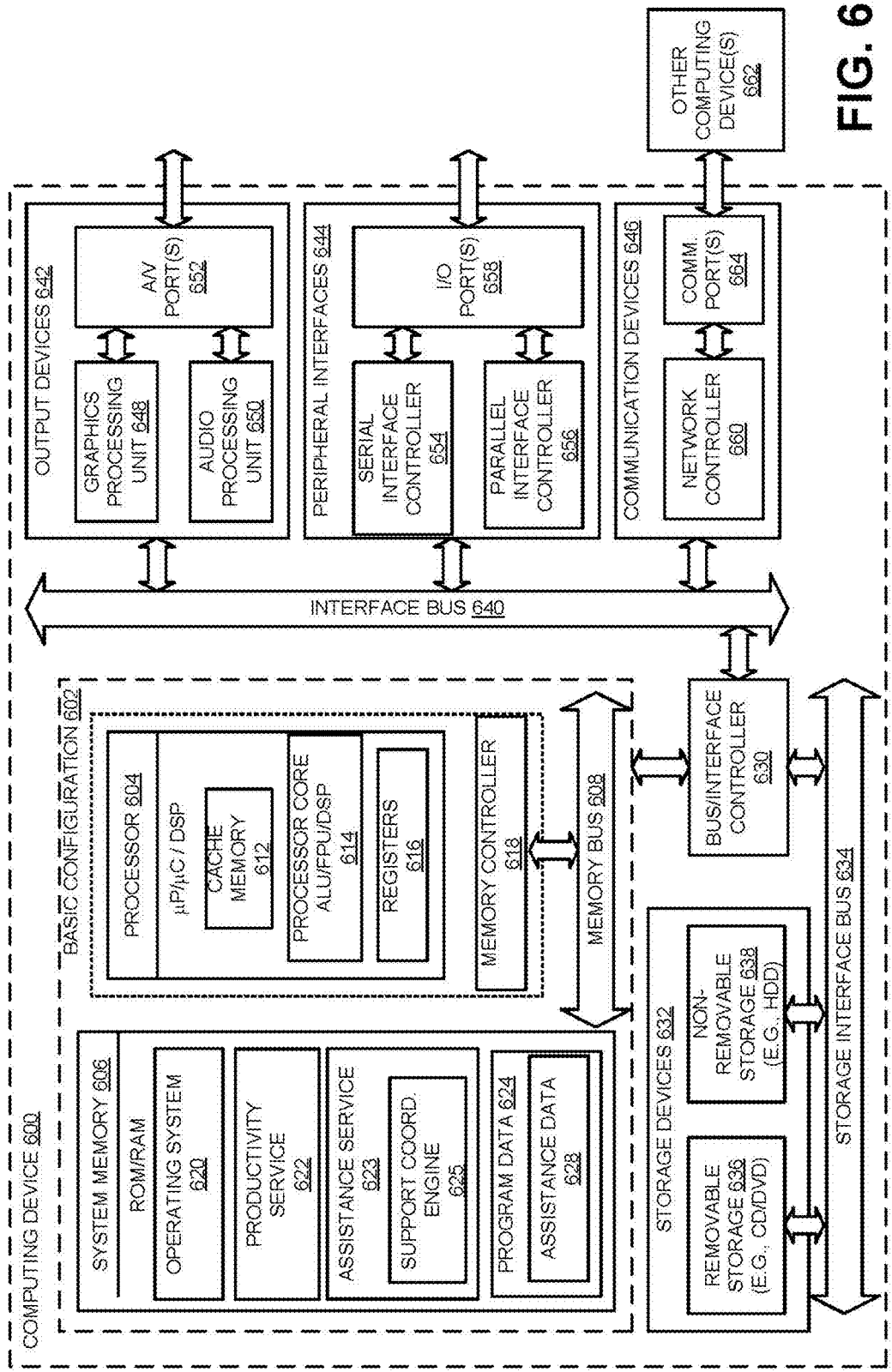
FIG. 6 is a block diagram of an example general purpose computing device, which may be used to provide on-demand or dynamic diagnostic and recovery operations in conjunction with a support service.

FIG. 6 is a block diagram of an example general purpose computing device, which may be used to provide on-demand or dynamic diagnostic and recovery operations in conjunction with a support service.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including, but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a productivity service 622, an assistance service 623, and program data 624. The assistance service 623 may provide on-demand or dynamic diagnostic and recovery operations in conjunction with a support service in conjunction with the support coordination engine 625 for the productivity service 622. The program data 624 may include, among other data, assistance data 628 such as telemetry data, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed, in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to provide on-demand or dynamic diagnostic and recovery operations in conjunction with a support service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
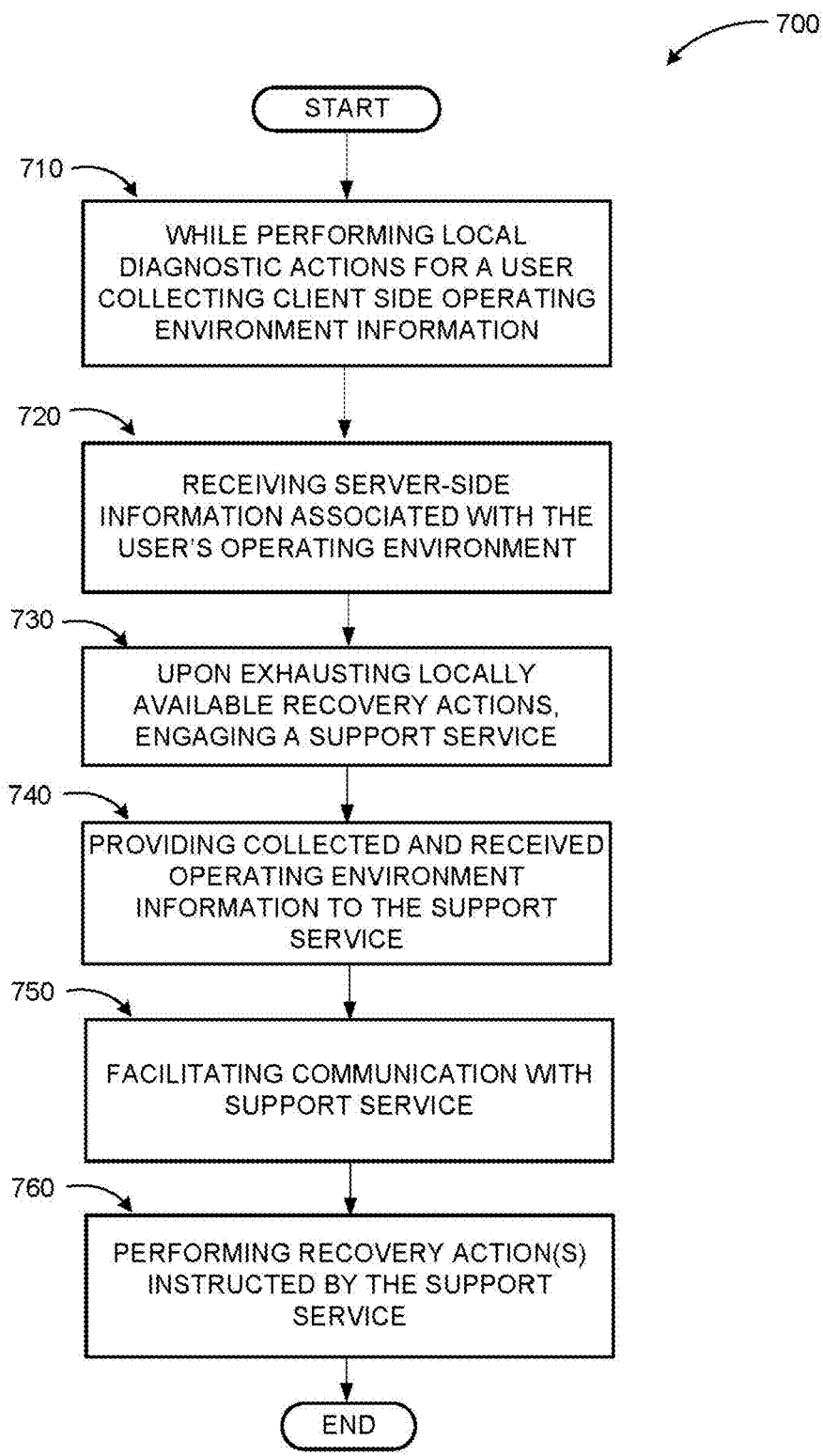
FIG. 7 illustrates a logic flow diagram of a method to provide on-demand or dynamic diagnostic and recovery operations in conjunction with a support service.

FIG. 7 illustrates a logic flow diagram of a method to provide on-demand or dynamic diagnostic and recovery operations in conjunction with a support service, according to embodiments.

Process 700 may be implemented on, a computing device, server, or other system. An example system may include a computer communicatively coupled to a productivity service server.

Process 700 begins with operation 710, where an assistance service or application may collect client-side operating environment information associated with physical configuration and software parameters of a user's computing device while performing diagnostic and recovery actions. At operation 720, similar server-side information associated with the user such as server-side physical configuration, software configuration, operational parameters, and user credentials (e.g., permission levels) may be received from the hosting service of the application with the issue (e.g., the productivity service).

At operation 730, the assistance service may engage a support service associated with the hosting service (e.g., the productivity service) upon exhausting local recovery actions. Relevant information that may help the support service such as the collected client-side information, the received server-side information, any diagnostic results, attempted recovery actions and their results, and/or user contact preferences may be provided to the support service at operation 740.

If the user prefers a communication that can be facilitated by the assistance service such as a messaging session, an audio or video online conference, etc. and the support service is available to communicate, the assistance service may facilitate the communication at operation 750. While facilitating the communication with the support service, the assistance service may also provide access to local resources and perform recovery actions suggested by the support service such as modifying configurations, rebooting applications and/or operating system, etc.

The operations included in process 700 are for illustration purposes. On-demand or dynamic diagnostic and recovery operations in conjunction with a support service may be implemented by, similar processes with fewer or additional steps, as well as in different order of operations using the principles described herein. The operations described herein may be executed by one or more processors, operated on one or more computing devices, one or more processor cores, specialized processing devices, and/or general purpose processors, among other examples.

According to examples, a means for providing on-demand or dynamic diagnostic and recovery operations in conjunction with a support service is described. The means may include a means for collecting hardware and software environment information associated with, a user device; a means for receiving hardware and software environment information associated with one or more servers executing a hosted service; in response to exhausting a set of automatic diagnostic and recovery actions associated with a component of the hosted service, a means for engaging the support service; a means for providing the collected hardware and software environment information associated with the user device and the received hardware and software environment information associated with the one or more servers to the support service; a means for facilitating a communication between a user associated with the user device and an operator of the support service; and a means for performing one or more diagnostic and recovery actions instructed by the operator of the support service.

According to some examples, a method to provide on-demand or dynamic diagnostic and recovery operations in conjunction with a support service is described. The method may include collecting hardware and software environment information associated with a user device; receiving hardware and software environment information associated with one or more servers executing a hosted service; in response to exhausting a set of automatic diagnostic and recovery actions associated with a component of the hosted service, engaging the support service; providing the collected hardware and software environment information associated with the user device and the received hardware and software environment information associated with the one or more servers to the support service; facilitating a communication between a user associated with the user device and an operator of the support service; and performing one or more diagnostic and recovery actions instructed by the operator of the support service.

According to other examples, the method may further include engaging the support service in response to a user request, receiving one or more communication preferences from the user; and providing the one or more communication preferences to the support service. The one or more communication preferences may include a timing and a modality of communication with the user. The collected hardware and software environment information associated with the user device may include one or more of: a memory capacity, a storage capacity, a processor capacity, a network connectivity, an operating system configuration, and state data of one or more applications executed on the user device. The received hardware and software environment information associated with the one or more servers may include one or more of: a memory capacity, a storage capacity, a processor capacity, a network connectivity, an operating system configuration, and one or more components of the hosted service.

According to further examples, providing the collected hardware and software environment information associated with the user device and the received hardware and software environment information associated with the one or more servers to the support service may include providing one or more of raw data, tabulated data, and analysis results. Providing the collected hardware and software environment information associated with the user device and the received hardware and software environment information associated with the one or more servers to the support service may further include providing one or more inferences made at an assistance service based on the collected hardware and software environment information associated with the user device and the received hardware and software environment information associated with the one or more servers. The method may also include providing a notification to the user prior to or while performing the one or more diagnostic and recovery actions instructed by the operator of the support service.

According to other examples, a computing device to provide on-demand or dynamic diagnostic and recovery operations in conjunction with a support service. The computing device may include a communication interface configured to facilitate communication between the computing device and one or more servers; a memory configured to store instructions; and one or more processors coupled to the memory, where the one or more processors, in conjunction with the instructions stored in the memory, are configured to execute a productivity service. The productivity service may include one or more productivity applications and an assistance application, where the assistance application may collect hardware and software environment information associated with a user device; receive hardware and software environment information associated with one or more servers executing a productivity service; in response to a user action or exhausting a set of automatic diagnostic and recovery actions associated with a component of the productivity service, engage the support service; provide the collected hardware and software environment information associated with the user device and the received hardware and software environment information associated with the one or more servers to the support service; facilitate a communication, between a user associated with the user device and an operator of the support service according to a communication preference received from the user; and perform one or more diagnostic and recovery actions instructed by the operator of the support service.

According to some examples, the assistance application may be further configured to facilitate the communication employing one or more modalities through a user interface of the assistance, application, facilitate the communication employing one or more modalities through a user interface of a communication application within the productivity service, and rollback one of a component of the productivity service and an application on the user device to a previous version. The assistance application may also be configured to rollback a configuration of the productivity service and a configuration of an application on the user device to a previous version. The productivity service may include one or more of a word processing application, a spreadsheet application, a presentation application, a note taking application, a communication application, and a calendar application.

According to further examples, a physical computer-readable storage medium with instructions stored thereon to provide on-demand or dynamic diagnostic and recovery operations in conjunction with a support service is described. The instructions may include collecting hardware and software environment information, associated with a user device; receiving hardware and software environment information associated with one or, more servers executing a hosted service; in response to a user action or exhausting a set of automatic diagnostic and recovery actions associated with a component of the hosted service, engaging the support service; providing the collected hardware and software environment information associated with the user device and the received hardware and software environment information associated with the one or more servers to the support service; facilitating a communication between a user associated with the user device and an operator of the support service according to a communication preference received from the user; performing one or more diagnostic and recovery actions instructed by the operator of the support service; and performing a rollback one of a component of the hosted service and an application on the user device to a previous version or configuration.

According to other examples, the instructions may further include providing feedback to the support service associated with the performed one or more diagnostic and recovery actions instructed by the operator of the support service. The instructions may be executed at the user device by a component of an assistance service. The component of the assistance, service may be a locally installed application or a web application. The assistance service may be an independent service or part of the hosted service.

The above specification, examples and data provide a complete description of the manufacture and use of the composition of the embodiments. Although the subject matter has been described in language specific to structural features and/or methodological acts, it is to be understood that the subject matter defined in the appended claims is, not necessarily limited to the specific features or acts described above. Rather, the specific features and acts described above are disclosed as example forms of implementing the claims and embodiments.

What is claimed is:

1. A method to provide on-demand, dynamic diagnostic and recovery operations in conjunction with a support service, the method comprising:
    collecting hardware and software environment information associated with a user device at an assistance client application executed on the user device, wherein at least some of the hardware and software environment information being collected is received from an operating system executed on the user device;
    receiving, at the assistance client application executed on the user device, hardware and software environment information associated with one or more servers from the one or more servers executing a hosted service, wherein a component of the hosted service is executed on the user device;
    in response to exhausting a set of automatic diagnostic and recovery actions associated with the component of the hosted service, engaging the support service;
    providing the collected hardware and software environment information associated with the user device and the received hardware and software environment information associated with the one or more servers to the support service;
    automatically facilitating a communication between a user associated with the user device and an operator of the support service through the assistance client application based on one or more contact preferences of the user; and
    performing one or more diagnostic and recovery actions on one or more of the component of the hosted service and the user device instructed by the operator of the support service.

2. The method of claim 1, further comprising:
    engaging the support service in response to a user request.

3. The method of claim 1, further comprising:
    receiving one or more communication preferences from the user; and
    providing the one or more communication preferences to the support service.

4. The method of claim 3, wherein the one or more communication preferences include a timing and a modality of communication with the user.

5. The method of claim 1, wherein the collected hardware and software environment information associated with the user device includes one or more of a memory capacity, a storage capacity, a processor capacity, a network connectivity, an operating system configuration, and state data of one or more applications executed on the user device.

6. The method of claim 1, wherein the received hardware and software environment information associated with the one or more servers includes one or more, of: a memory capacity, a storage capacity, a processor capacity, a network connectivity, an operating system configuration, and one or more components of the hosted service.

7. The method of claim 1, wherein providing the collected hardware and software environment information associated with the user device and the received hardware and software environment information associated with the one or more servers to the support service comprises:
    providing one or more of raw data, tabulated data, and analysis results.

8. The method of claim 1, wherein providing the collected hardware and software environment information associated with the user device and the received hardware and software environment information associated with the one or more servers to the support service further comprises:
    providing one or more inferences made at an assistance service based on the collected hardware and software environment information associated with the user device and the received hardware and software environment information associated with the one or more servers.

9. The method of claim 1, further comprising:
    providing a notification to the user prior to or while performing the one or more diagnostic and recovery actions instructed by the operator of the support service.

10. A computing device to provide on-demand or dynamic diagnostic and recovery operations in conjunction with a support service, the computing device comprising:

a communication interface configured to facilitate communication between the computing device and one or more servers;

a memory configured to store instructions; and one or more processors coupled to the memory, wherein the one or more processors, in conjunction with the instructions stored in the memory, are configured to execute a productivity service, the productivity service comprising:

one or more productivity applications and an assistance application, wherein the assistance application is configured to:

collect, hardware and software environment information associated with a user device at an assistance client application executed on the user device, wherein at least some of the hardware and software environment information being collected is received from an operating system executed on the user device;

receive, at the assistance client application executed on the user device, hardware and software environment information associated with one or more servers from the one or more servers executing a productivity service, wherein a component of the productivity service is executed on the user device;

in response to a user action or exhausting a set of automatic diagnostic and recovery actions associated with the component of the productivity service, engage the support service;

provide the collected hardware and software environment information associated with the user device and the received hardware and software environment information associated with the one or more servers to the support service;

automatically facilitate a communication between a user associated with the user device and an operator of the support service through the assistance client application based on one or more contact preferences of the user according to a communication preference received from the user; and perform one or more diagnostic and recovery actions on one or more of the component of the productivity service and the user device instructed by the operator of the support service.

11. The computing device of claim 10, wherein the assistance application is further configured to:

facilitate the communication employing one or more modalities through a user interface of the assistance application.

12. The computing device of claim 10, wherein the assistance application is further configured to:

facilitate the communication employing one or more modalities through a user interface of a communication application within the productivity service.

13. The computing device of claim 10, wherein the assistance application is further configured to:

rollback one of a component of the productivity service and an application on the user device to a previous version.

14. The computing device of claim 10, wherein the assistance application is further configured to:

rollback a configuration of the productivity service and a configuration of an application on the user device to a previous version.

15. The computing device of claim 10, wherein the productivity service includes one or more of a word processing application, a spreadsheet application, a presentation application, a note taking application, a communication application, and a calendar application.

16. A physical computer-readable hardware device with instructions stored thereon to provide on-demand, dynamic diagnostic and recovery operations in conjunction with a support service, the instructions comprising:

collecting hardware and software environment information associated with a user device at an assistance client application executed on the user device, wherein at least some of the hardware and software environment information being collected is received from an operating system executed on the user device;

receiving, at the assistance client application executed on the user device, hardware and software environment information associated with one or more servers from the one or more servers executing a hosted service, wherein a component of the hosted service is executed on the user device;

in response to a user action or exhausting a set of automatic diagnostic and recovery actions associated with the component of the hosted service, engaging the support service;

providing the collected hardware and, software environment information associated with the user device and the received hardware and software environment information associated with the one or more servers to the support service;

automatically facilitating a communication between a user associated with the user device and an operator of the, support service through the assistance client application based on one or more contact preferences of the user according to a communication preference received from the user;

performing one or more diagnostic and recovery actions on one or more of the component of the hosted service and the user device instructed by the operator of the support service; and performing a rollback one of a component of the hosted service and an application on the user device to a previous version or configuration.

17. The physical computer-readable hardware device of claim 16, wherein the instructions further comprise:

providing feedback to the support service associated with the performed one or more diagnostic and recovery actions instructed by the operator of the support service.

18. The physical computer-readable hardware device of claim 16, wherein the instructions are executed at the user device by a component of an assistance service.

19. The physical computer-readable hardware device of claim 18, wherein the component of the assistance service is one of a locally installed application and a web application.

20. The physical computer-readable hardware device of claim 16, wherein the assistance service is one of an independent service and part of the hosted service.

* * * * *